United States Patent
McMillan

(10) Patent No.: US 9,106,953 B2
(45) Date of Patent: Aug. 11, 2015

(54) MEDIA MONITORING BASED ON PREDICTIVE SIGNATURE CACHING

(71) Applicant: The Nielsen Company (US), LLC, New York, NY (US)

(72) Inventor: Gavin McMillan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 13/687,825

(22) Filed: Nov. 28, 2012

(65) Prior Publication Data

US 2014/0150001 A1 May 29, 2014

(51) Int. Cl.
- *H04H 60/32* (2008.01)
- *H04N 21/442* (2011.01)
- *H04N 21/8358* (2011.01)

(52) U.S. Cl.
CPC ..... *H04N 21/44213* (2013.01); *H04N 21/8358* (2013.01)

(58) Field of Classification Search
CPC ..................................................... H04N 21/47
USPC ....................................................... 725/9–19
See application file for complete search history.

(56) References Cited

U.S. PATENT DOCUMENTS

| | | | |
|---|---|---|---|
| 4,677,466 A | 6/1987 | Lert, Jr. et al. | |
| 4,697,209 A | 9/1987 | Kiewit et al. | |
| 4,739,398 A * | 4/1988 | Thomas et al. | 725/22 |
| 5,436,653 A | 7/1995 | Ellis et al. | |
| 5,481,294 A | 1/1996 | Thomas et al. | |
| 5,512,933 A | 4/1996 | Wheatley et al. | |
| 5,574,963 A | 11/1996 | Weinblatt et al. | |
| 5,594,934 A | 1/1997 | Lu et al. | |
| 6,272,176 B1 | 8/2001 | Srinivasan | |
| 6,453,252 B1 | 9/2002 | Laroche | |
| 6,469,749 B1 | 10/2002 | Dimitrova et al. | |
| 6,513,161 B2 | 1/2003 | Wheeler et al. | |
| 6,513,717 B2 | 2/2003 | Hannigan | |
| 6,675,383 B1 | 1/2004 | Wheeler et al. | |
| 6,697,103 B1 | 2/2004 | Fernandez et al. | |
| 6,990,453 B2 | 1/2006 | Wang et al. | |
| 7,006,176 B2 | 2/2006 | Fujibayashi et al. | |
| 7,072,487 B2 | 7/2006 | Reed et al. | |
| 7,284,255 B1 | 10/2007 | Apel et al. | |
| 7,421,723 B2 | 9/2008 | Harkness et al. | |
| 7,460,684 B2 | 12/2008 | Srinivasan | |
| 7,587,728 B2 | 9/2009 | Wheeler et al. | |

(Continued)

*Primary Examiner* — Pankaj Kumar
*Assistant Examiner* — Charles N Hicks
(74) *Attorney, Agent, or Firm* — Hanley, Flight & Zimmerman, LLC

(57) ABSTRACT

Methods, apparatus, systems and articles of manufacture for media monitoring based on predictive signature caching are disclosed. Disclosed example methods to monitor media via a meter include comparing, at the meter, a set of site signatures generated by the meter for a first time period with a first set of reference signatures representative of reference media predicted to be presented during the first time period. Such example methods also include, when a first subset of the site signatures is determined to match a first subset of reference signatures from the first set, reporting, via the meter, metering data indicating that first reference media represented by the first subset of reference signatures was presented during the first time period. Such example methods further include, when the set of site signatures fails to match the first subset of reference signatures, reporting, via the meter, the set of site signatures.

23 Claims, 8 Drawing Sheets

(56) References Cited

U.S. PATENT DOCUMENTS

| | | |
|---|---|---|
| 7,590,259 B2 | 9/2009 | Levy et al. |
| 7,623,823 B2 | 11/2009 | Zito et al. |
| 7,630,888 B2 | 12/2009 | Bichsel |
| 7,672,843 B2 | 3/2010 | Srinivasan et al. |
| 7,783,889 B2 | 8/2010 | Srinivasan |
| 7,793,318 B2 | 9/2010 | Deng |
| 8,006,258 B2 * | 8/2011 | Ramaswamy ..................... 725/9 |
| 8,060,372 B2 | 11/2011 | Topchy et al. |
| 8,065,697 B2 | 11/2011 | Wright et al. |
| 2002/0083060 A1 | 6/2002 | Wang et al. |
| 2002/0133499 A1 | 9/2002 | Ward et al. |
| 2004/0049473 A1 | 3/2004 | Gower et al. |
| 2004/0064319 A1 | 4/2004 | Neuhauser et al. |
| 2004/0122679 A1 | 6/2004 | Neuhauser et al. |
| 2005/0039064 A1 | 2/2005 | Balakrishnan et al. |
| 2005/0232411 A1 | 10/2005 | Srinivasan et al. |
| 2005/0288954 A1 | 12/2005 | McCarthy et al. |
| 2006/0153296 A1 | 7/2006 | Deng |
| 2006/0184961 A1 | 8/2006 | Lee et al. |
| 2006/0195857 A1 * | 8/2006 | Wheeler et al. ................. 725/15 |
| 2006/0195861 A1 | 8/2006 | Lee |
| 2006/0277047 A1 | 12/2006 | DeBusk et al. |
| 2007/0274537 A1 | 11/2007 | Srinivasan |
| 2008/0086304 A1 | 4/2008 | Neuhauser |
| 2008/0091288 A1 | 4/2008 | Srinivasan |
| 2008/0276265 A1 | 11/2008 | Topchy et al. |
| 2009/0049465 A1 | 2/2009 | Deng |
| 2010/0131970 A1 | 5/2010 | Falcon |
| 2010/0262642 A1 | 10/2010 | Srinivasan |
| 2010/0268540 A1 | 10/2010 | Arshi et al. |
| 2010/0268573 A1 | 10/2010 | Jain et al. |
| 2011/0088053 A1 | 4/2011 | Lee |
| 2011/0106587 A1 | 5/2011 | Lynch et al. |
| 2012/0005333 A1 | 1/2012 | Beattie, Jr. et al. |
| 2012/0011533 A1 | 1/2012 | Wright et al. |
| 2012/0056785 A1 | 3/2012 | Jovicic et al. |
| 2012/0266187 A1 * | 10/2012 | Deng .............................. 725/19 |
| 2013/0251189 A1 | 9/2013 | McMillan |

* cited by examiner

MEDIA MONITORING BASED ON PREDICTIVE SIGNATURE CACHING

FIELD OF THE DISCLOSURE

This disclosure relates generally to media monitoring and, more particularly, to media monitoring based on predictive signature caching.

BACKGROUND

An audience measurement system typically includes one or more device meters to monitor the media presented by one or more media devices located at one or more monitored sites. Such a device meter can use watermarks decoded from the presented media and/or signatures (also referred to as media fingerprints) generated from the presented media, or both, to monitor (e.g., identify and/or track) the media being presented by a media device. For example, identification codes, such as watermarks, ancillary codes, etc., may be transmitted within media signals. Identification codes are data that are transmitted with media (e.g., inserted into the audio, video, or metadata stream of media) to uniquely identify broadcasters and/or media (e.g., content or advertisements), and/or are associated with the media for another purpose such as tuning (e.g., packet identifier headers ("PIDs") used for digital broadcasting). Codes are typically extracted using a decoding operation.

In contrast, signatures are a representation of some characteristic of the media signal (e.g., a characteristic of the frequency spectrum of the signal). Signatures can be thought of as fingerprints. They are typically not dependent upon insertion of identification codes in the media, but instead preferably reflect an inherent characteristic of the media and/or the signal transporting the media. Systems to utilize codes and/or signatures for audience measurement are long known. See, for example, Thomas, U.S. Pat. No. 5,481,294, which is hereby incorporated by reference in its entirety.

When signatures are used for media monitoring, signatures of the monitored media (referred to herein as collected signatures or site signatures) are generated by the device meter and compared to reference signatures representative of reference media known to the audience measurement system. In prior audience measurement systems, the device meters typically provide their generated site signatures to a data processing facility or other centralized processing site for comparison with the reference signatures that are representative of the possible reference media available for consumption at the respective monitored sites. Such comparison may involve comparing large numbers of site signatures with large numbers of reference signatures, especially when the number of monitored sites is large and/or the amount of possible reference media available for consumption is large.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
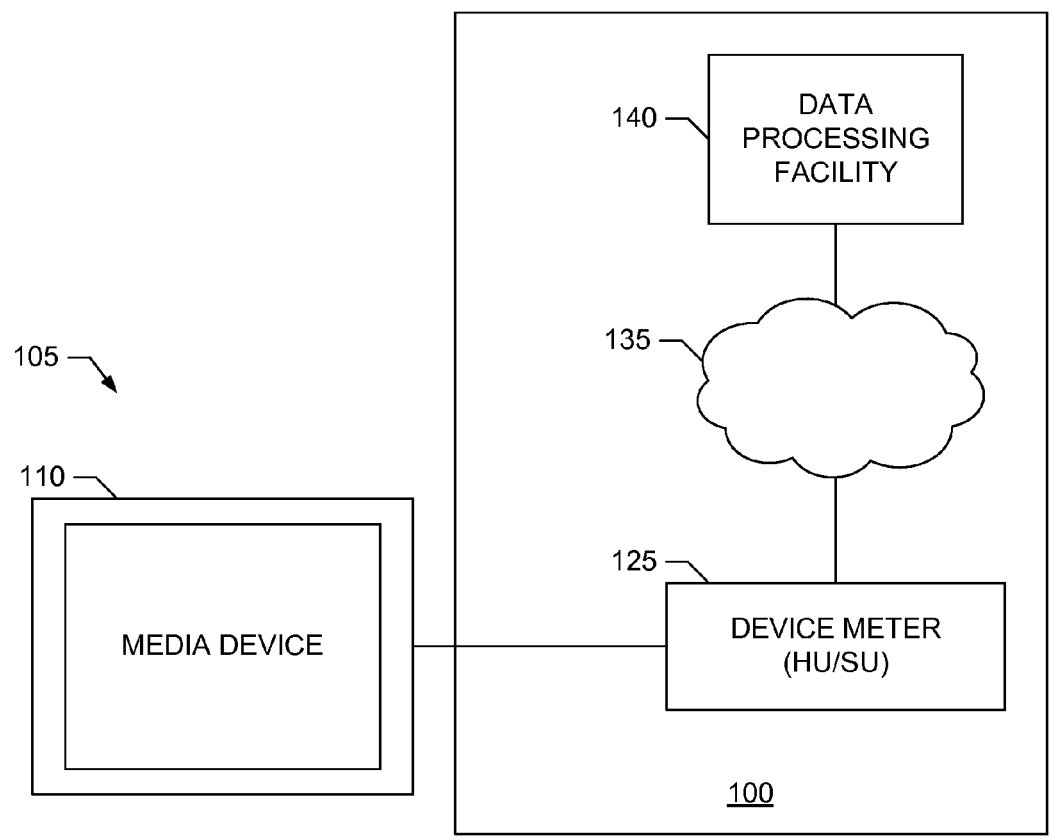
FIG. 1 is a block diagram of an example audience measurement system that supports media monitoring based on predictive signature caching as disclosed herein.

Example methods, apparatus, systems and articles of manufacture (e.g., physical storage media) for monitoring media based on predictive signature caching are disclosed herein. Example methods to monitor, via a meter, media presented by a media device include comparing, at the meter, a set of site signatures generated by the meter for a first time period with a first set of reference signatures representative of reference media predicted to be presented during the first time period. Such example methods can also include, when a first subset of the site signatures is determined to match a first subset of reference signatures from the first set, reporting, via the meter, metering data indicating that first reference media represented by the first subset of reference signatures was presented during the first time period. Such example methods can further include, when the set of site signatures fails to match the first subset of reference signatures, reverting to reporting, via the meter, the set of site signatures.

Some such example methods additionally include selecting the first set of reference signatures from a cache of reference signatures stored at the meter. In such examples, the cache of reference signatures is representative of reference media predicted to be presented during a monitoring interval including the first time period. In some such examples, the cache of reference signatures is provided to the meter by a data processing facility prior to the beginning of the monitoring interval.

In some such examples, the cache of reference signatures includes time information specifying time windows during which each respective subset of reference signatures representative of each respective reference media is to be used by the meter for media monitoring. In such examples, the selection of the first set of reference signatures from the cache of reference signatures is based on the time information. Moreover, in some such examples, a first time window specified for the first subset of reference signatures representative of the first reference media can be different from a second time window specified for a second subset of reference signatures representative of second reference media.

Additionally or alternatively, in some such examples, the cache of reference signatures includes type information specifying whether the first reference media represented by the first subset of reference signatures corresponds to at least one of live media predicted to be presented during the first time period, or time-shifted media predicted to be presented during the first time period. In some such examples, the metering data includes at least one of first information when the first reference media represented by the first subset of reference signatures corresponds to live media predicted to be presented during the first time period, or second information different from the first information when the first reference media represented by the first subset of reference signatures corresponds to time-shifted media predicted to be presented during the first time period.

In some examples of the preceding methods, the first set of reference signatures corresponds to a first type of signature from among at least two types of signatures supported by the meter. For example, the first type of signature may have a lower resolution than a second type of signature from among the at least two types of signatures.

Other disclosed example methods to monitor media include processing historical metering data provided by a meter monitoring media presented at a monitored site to predict media exposure that is to occur at the monitored site during a future monitoring interval. Such example methods also include obtaining reference signatures representative of reference media predicted to be presented at the monitored site during the future monitoring interval. Such example methods further include providing the reference signatures to the meter prior to the future monitoring interval for use by the meter to perform media monitoring during the future monitoring interval. Such example methods can be implemented by, for example, one or more processors at a data processing facility.

In some such examples, the reference signatures include multiple subsets of reference signatures, and each subset of reference signatures is representative of respective reference media predicted to be presented at the monitored site during the future monitoring interval. Some such example methods further include providing time information to the meter prior to the future monitoring interval. Such time information may specify, for example, time windows during which each respective subset of reference signatures is to be used by the meter for media monitoring. For example, a first time window specified for a first subset of reference signatures representative of first reference media predicted to be presented at the monitored site during the future monitoring interval may be different from a second time window specified for a second subset of reference signatures representative of second reference media predicted to be presented at the monitored site during the future monitoring interval. Additionally or alternatively, some such example methods further include providing type information specifying whether first reference media represented by a first subset of reference signatures corresponds to at least one of live media predicted to be presented at the monitored site during the future monitoring interval, or time-shifted media predicted to be presented at the monitored site during the future monitoring interval.

In some examples, processing of the historical metering data includes processing the historical metering data to determine a first media exposure pattern corresponding to prior live media presented at the monitored site, and processing the historical metering data to determine a second media exposure pattern corresponding to prior time-shifted media usage at the monitored site. Such examples can also include comparing the first and second media exposure patterns to media scheduling information to determine the reference media predicted to be presented at the monitored site during the future monitoring interval. Then, for each live media source included in the reference media, such example methods can include providing first information specifying a respective time window during which the respective live media source is to be available for presentation at the monitored site. Additionally or alternatively, for each time-shifted media source included in the reference media, such example methods can include providing second information specifying a respective time window during which the respective time-shifted media source is predicted to be presented at the monitored site.

These and other example methods, apparatus, systems and articles of manufacture (e.g., physical storage media) to implement media monitoring based on predictive signature caching are disclosed in greater detail below.

Media measurement companies can employ a variety of techniques to monitor media being consumed by a population. For example, panels containing recruited groups of persons (e.g., selected statistically) can be used to represent one or more demographic populations. In such examples, the media devices used by the panelists can be monitored by an audience measurement system using device meters to determine the media being presented by the media devices, from which media exposure and/or consumption can be inferred. As mentioned above, some device meters employ media signatures (also referred to as media fingerprints) to determine the media being presented by a media device and, by extension, to estimate the exposure of the media to the person(s) using the media device. Media signatures (e.g., audio and/or video signatures) can be generated, as noted above, from media signals (e.g., audio and/or video signals) sensed (e.g., detected, captured, etc.) via one or more sensors of the device meter, and/or otherwise received by the device meter.

In prior signature-based audience measurement systems, the site media signatures generated by a device meter during a monitoring interval are reported (e.g., in real-time or at certain reporting intervals) by the device meter to a central data processing facility. The data processing facility receives the media signatures reported by the device meters of the audience measurement system, and compares these site media signatures to a library of reference media signatures representative of reference media known to the audience measurement system. When a match is found, the media corresponding to the site signature being processed can be identified as corresponding to the reference media represented by the matching reference signature(s). Because the central data processing facility is responsible for performing signature matching in such prior audience measurement systems, such facilities may have high implementation and support costs, especially when signatures from a large number of device meters are to be processed within monitoring intervals having high granularity. Also, such prior systems can exhibit high data transmission costs given that the device meters must report their generated media signatures back to the central data processing facility for processing. Unlike such prior system, media monitoring based on predictive signature caching as disclosed herein enables the device meters themselves (e.g., the meter(s) at the monitored location(s)) to perform signature matching and media identification. As such, media monitoring based on predictive signature caching can result in lower implementation and support costs at the central data processing facility, as well as lower data transmission costs.

Moreover, in at least some examples, media monitoring based on predictive signature caching as disclosed herein enables the device meters to perform signature matching using light media signatures, as opposed to the rich media signatures utilized in prior systems. Rich media signatures generally have higher resolution than light media signatures. For example, rich signatures may include more sample points per signature generation period, and/or more bits per sample point, than light media signatures. As such, identification of media may be possible with fewer rich media signatures than light media signatures, thereby resulting in faster identification times for rich media signatures relative to light media signatures. For this reason, prior audience measurement systems typically use rich media signatures to enable comparisons of monitored media with large libraries of reference media to be completed in reasonable amounts of time. However, the use of such rich media signatures may yield associated higher computation and data transmission costs.

In contrast, media monitoring based on predictive signature caching involves predicting the possible media expected to be presented at a monitored site, thereby reducing the library of reference media that is to be compared against the media monitored at the monitored site. Such prediction, and the resulting reduction in the amount of possible reference media, can enable the use of light media signatures. For example, by reducing the size of the reference media library for a given monitored site, signature comparison based on light signatures may still yield identification results in a reasonable timeframe. Moreover, due to the lower processing and data transmission costs associated with light signatures relative to rich signatures, the use of light media signatures can further enable signature matching to be migrated to the device meters in an audience measurement system.

Media monitoring based on predictive signature caching leverages the fact that people are creatures of habit. For example, viewing patterns from television measurement confirm that a given person typically watches television during similar times on a given day week after week, and often views different episodes of the same programs week after week. In other words, viewers have an interest and loyalty to programs they like, and will typically watch many of the episodes of the same program during a programming season or during periods when a distributor makes the programs available. Today, people often use time-shifting devices, such as digital video recorders (DVRs), which can record a program when it is broadcast, and play the recorded program back at a later time. This practice of recording or obtaining media at one time and presenting it at a later time is referred to as time shifting. Patterns of viewing also occur for time shifted viewing. For example, over time, a given person may consistently watch different time shifted episodes of the same program at the same, or similar, time offsets relative to the original broadcast times of the respective episodes (e.g., such as consistently watching newly recorded episodes of a weekly program on the following evening after the respective episode was originally broadcast). As described in greater detail below, such media exposure patterns can be determined from prior media exposure data, and can be used to predict future media exposure at a given monitored site. By predicting future media exposure at the monitored site, the library of reference media to be evaluated for the monitored site can be reduced to include, for example, only the reference media predicted to be presented within the next monitoring interval.

Turning to the figures, a block diagram of an example audience metering system 100 employing media monitoring based on local predictive signature caching as disclosed herein is illustrated in FIG. 1. The example audience measurement system 100 supports monitoring of media exposure to audiences at one or more monitored sites, such as the example monitored site 105 illustrated in FIG. 1. The monitored site 105 includes an example media device 110, which is also referred to herein as a media presentation device 110. Although the example of FIG. 1 illustrates one monitored site 105 and one media device 110, media monitoring based on predictive signature caching as disclosed herein can be used in audience measurement systems 100 supporting any number of monitored sites 105 having any number of media devices 110.

The audience measurement system 100 of the illustrated example includes an example device meter 125, also referred to as a meter 125, a site meter 125, a site unit 125, a home unit 125, etc., to monitor media presented by the media device 110. In the illustrated example, the media monitored by the device meter 125 can correspond to any type of media presentable by the media device 110. For example, monitored media can correspond to media content, such a television programs, radio programs, movies, etc., as well as commercials, advertisements, etc. In the illustrated example, the device meter 125 determines metering data that may identify and/or be used to identify media exposure (and, thus, infer media consumption) at the monitored site 105. The audience measurement meter 125 then stores and reports this metering data via an example network 135 to an example data processing facility 140. The data processing facility 140 performs any appropriate post-processing of the audience measurement data to, for example, determine audience ratings information, identify targeted advertising to be provided to the monitored site 105, etc. In the illustrated example, the network 130 can correspond to any type(s) and/or number of wired and/or wireless data networks, or any combination thereof.

In the illustrated example, the media device 110 monitored by the device meter 125 can correspond to any type of audio, video and/or multimedia presentation device capable of presenting media audibly and/or visually. For example, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As other examples, the media device 110 can correspond to a multimedia computer system, a personal digital assistant, a cellular/mobile smartphone, a radio, a tablet, etc.

In the audience measurement system 100 of the illustrated example, the device meter 125 and the data processing facility 140 cooperate to perform media monitoring based on predictive signature caching as disclosed herein. Unlike media monitoring techniques based on codes and/or watermarks included with and/or embedded in the monitored media, signature-based media monitoring techniques generally use one or more inherent characteristics of the monitored media during a signature sampling interval to generate a substantially unique proxy for the media. Such a proxy is referred to as a signature or signature, and can take the form of a series of digital values, a waveform, etc., representative of the media signal(s), such as the audio and/or video signals, forming the media presentation being monitored. A good signature is usually one that is repeatable when processing the same media presentation, but that is unique when processing other presentations of other media. Thus, as used herein, a signature is a representation of some characteristic of the media signal (e.g., a characteristic of the frequency spectrum of the signal) which can be used to identify the signal, and can be thought of as a fingerprint. Signatures are typically not dependent upon insertion of identification codes in the media, but instead preferably reflect an inherent characteristic of the media and/or the signal transporting the media. Systems to utilize codes and/or signatures for audience measurement are long known. See, for example, Thomas, U.S. Pat. No. 5,481,294, which is hereby incorporated by reference in its entirety.

Signature-based media monitoring generally involves determining (e.g., generating) site signature(s) (also referred to as collected signature(s)) representative of a media signal (e.g., an audio signal and/or a video signal) output by a monitored media device at a monitored site, and comparing the site signature(s) to one or more references signatures corresponding to known (e.g., reference) media sources. Various comparison criteria, such as a cross-correlation value, a Hamming distance, etc., can be evaluated to determine whether a site signature matches a particular reference signature. When a match between the site signature and one of the reference signatures is found, the monitored media represented by the site signature can be identified as corresponding to the particular reference media source represented by the reference signature that matched the site signature. Because attributes, such as an identifier of the media, a presentation time, a broadcast channel, etc., are collected and, thus, known for the reference media represented by the reference signature, these attributes may then be associated with the monitored media whose site signature matched the reference signature.

For example, in the audience measurement system 100 of FIG. 1, the device meter 125 may utilize invasive monitoring involving one or more physical connections to the media device 110, and/or non-invasive monitoring not involving any physical connection to the media device 110, to obtain access to one or more media signals corresponding to the media being presented by the media device 110. In some examples, the device meter 125 may process audio signals obtained from the media device 110 via a microphone and/or a direct cable connection to generate audio site signatures representative of the media being presented by the media device 110. Additionally or alternatively, the device meter 125 may process video signals obtained from the media device 110 via a camera and/or a direct cable connection to generate video site signatures (e.g., image signatures) representative of the media being presented by the media device 110. The site signatures generated by the device meter 125 can then be compared with known reference signatures to identify/monitor the media being presented by the media device 110.

Furthermore, unlike prior signature-based media monitoring techniques, the device meter 125 performs signature matching using a cache of reference signatures provided by the data processing facility 140 and representative of a site-specific library of reference media predicted to be presented by the monitored media device 110 during a next monitoring interval. For example, and as described in greater detail below, the data processing facility 140 of the illustrated example processes metering data previously reported by the device meter 125 to determine one or more media exposure patterns associated with the monitored site 105 associated with the media device 110. The data processing facility 140 further uses the media exposure pattern(s) determined for the monitored site 105 to predict, from among a library of reference media maintained by the data processing facility 140, the media that is likely to be consumed at the monitored site and, thus, presented by the media device 110 during a future (such as the next) monitoring interval. The data processing facility 140 then prepares a package of reference signatures containing the reference signatures representative of the reference media predicted to be presented at the monitored site 105 during the future monitoring interval, and provides (e.g., via the network 135) the reference signature package to the device meter 125 monitoring the media device 110.

In addition to the selected reference signatures, the reference signature package may also include descriptive information identifying the different reference media represented by the reference signatures, specifying one or more windows of time during which the different reference media represented in the package are predicted to be consumed and/or presented, specifying the type(s) of the different reference media represented in the package (e.g., such as whether a particular reference media corresponds to live or time-shifted media), the duration(s) of the different reference media included in the package, etc. As used herein, live media refers to media that is, for example, presented and/or consumed as the media is received by the monitored media device 110. For example, live media can correspond to a presentation of broadcasted or streamed media in real-time as the broadcasted or streamed media is received by the media device 110. Accordingly, live media can be associated with a broadcast schedule, a streaming availability schedule, etc. In contrast, as used herein, time-shifted media refers to media that is, for example, recorded or downloaded for later presentation by the media device 110. For example, time-shifted media can correspond to a later presentation by the media device 110 of media that was previously recorded or downloaded by the media device 110 or another device at the monitored site 105.

In some examples, the device meter 125 receives the reference signature package from the data processing facility 140 and stores the reference signatures and accompanying reference media descriptive information in a cache for use during the appropriate future monitoring interval with which the reference signature package is associated. For example, the reference signature package could be provided by the data processing facility 140 for use during the immediately next monitoring interval, or some future monitoring interval indicated by information provided in the reference signature package. Then, during the appropriate monitoring interval, the device meter 125 uses its cached reference signatures to monitor the media presented by the media device 110. For example, during the appropriate monitoring interval associated with a package of cached reference signatures, the media device 110 can compare a set of site signatures generated by the device meter 125 during a given (e.g., current or past) time period (and which are representative of the media being presented by the media device 110 during the given time period) with a set of cached reference signatures representative of the reference media predicted to be presented during the given time period. As described in greater detail below, the device meter 125 can select the subset(s) of reference signatures corresponding to the given time period based on the reference media descriptive information included in the reference signature package provided by the data processing facility 140.

In some examples, if the device meter 125 determines that at least a subset of the site signatures associated with a given time period matches at least a subset of the reference signatures, the device meter 125 prepares and reports (e.g., in real-time or at a later reporting time) metering data to indicate (by media identification information and duration) that the particular reference media represented by the matching subset of reference signatures was presented by the media device 110 during the given time period associated with the site signatures. For example, media signatures are typically generated at some signature rate, such as one signature per every 15 seconds, 30 seconds, etc. Thus, when the media being presented by the media device 110 matches one of the reference media predicted to be presented during the given time period, at least a subset of the sequence of site signatures generated during that time period is expected to match a respective subset of the sequence of reference signatures representative of the matching reference media. However, if the set of site signatures for the given time period fails to match any of the subset(s) of references signatures for the time period, the device meter 125 can, for example, revert to reporting the site signatures to the data processing facility 140 for comparison again a presumably larger collection of reference signatures representative of a correspondingly larger collection of reference media.

In some examples, the device meter 125 reports its metering data for a given measurement interval, and any site signatures to be reported for time period(s) in which predicted media exposure did not occur, to the data processing facility 140 (e.g., via the network 135) at specified or otherwise configured reporting intervals. In some examples, the device meter 125 may also retrieve, from the data processing facility 140, the reference signature package for the next and/or some other future monitoring interval. Furthermore, in some examples, the audience measurement system 100 combines media monitoring based on predictive signature caching, as disclosed herein, with other media identification techniques, such as media identification based on (a) watermarks/codes embedded or otherwise included with the monitored media, (b) tuning data and/or device operation data obtained by monitoring operation of the media device 110, etc.

Although not illustrated in FIG. 1, in some examples, the audience measurement system 100 may include includes a people meter to capture information about the audience or, more generally, panel member(s) at the monitored site 105, which may then be used to extrapolate demographic information, media exposure and/or consumption information, etc., for a population represented by the panel. Some example people meters may be configured to receive information from a control device having a set of input keys, each assigned to represent a single panel member. Such an example people meter may prompt the panel members to indicate that they are present in the monitored panel by pressing the appropriate input key on the control device. In some examples, the people meter may also receive information from the device meter 110 to determine a time at which to prompt the panel members. Moreover, the device meter 110 may receive information from the people meter and/or the people meter control device to modify an operation of the device meter 110 (e.g., such as causing the device meter 110 to generate one or more metering data records based on a change in the monitored group of panel member(s) at the monitored site 105.

Figure 2:
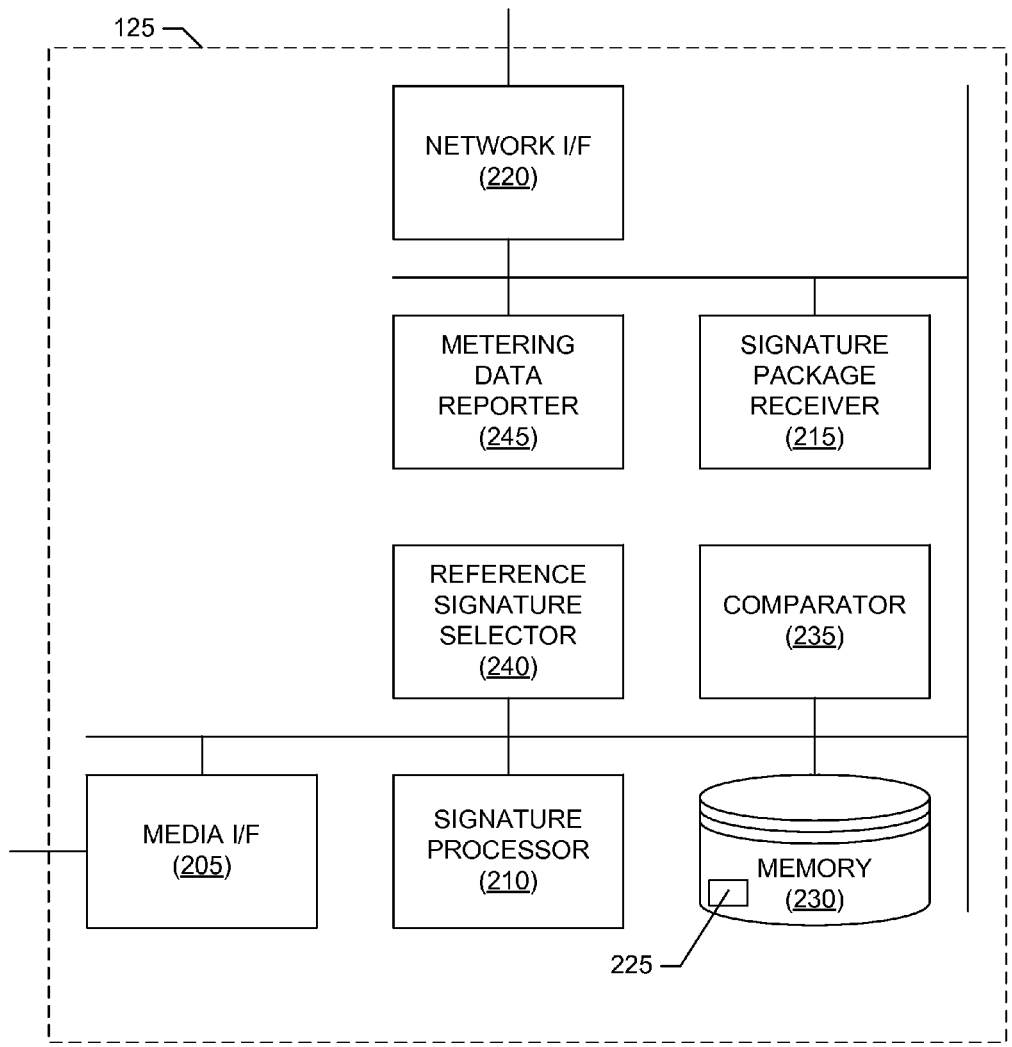
FIG. 2 is a block diagram of an example meter that can be used to implement the example audience measurement system of FIG. 1.

A block diagram of an example implementation of the device meter 125 of FIG. 1 is illustrated in FIG. 2. The example device meter 125 of FIG. 2 can be implemented as a metering device that is separate from the media device 125 but able to sense/detect media signal(s) from the media device 125, or by or in the media device 125 (e.g., such as in the case of being implemented as a process executing in consumer electronics used by the panelist, in a personal computer, in a smartphone, in a smart television etc.), or by a combination thereof. The example device meter 125 of FIG. 2 includes an example media interface 205 to obtain access to one or more media signals output by the media device 110. For example, the media interface 205 can be implemented by one or more cable connections to electrically, optically or otherwise communicatively couple with one or more audio outputs and/or video outputs of the media device 110. Additionally or alternatively, the media interface 205 can be implemented by one or more audio sensors, such as a microphone, a transducer, etc., capable of non-invasively receiving and processing an audio signal (e.g., such as an acoustic signal) that is output by the media device 110. Additionally or alternatively, the media interface 205 can be implemented by one or more video sensors, such as a camera, a light detector, etc., capable of non-invasively receiving and processing a video signal (e.g., such as video frames) output by the media device 110.

The example device meter 125 of FIG. 2 also includes an example signature processor 210 to generate site signatures from the media signal(s) obtained via the media interface 205. Each site signature generated by the signature processor 210 is representative of a respective segment of the media (e.g., corresponding to several seconds of the media) being presented by the media device 110. Examples of signature techniques that can be implemented by the signature processor 210 include, but are not limited to, any or all of the techniques described in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008, all of which are hereby incorporated by reference in their respective entireties.

Figure 2A:
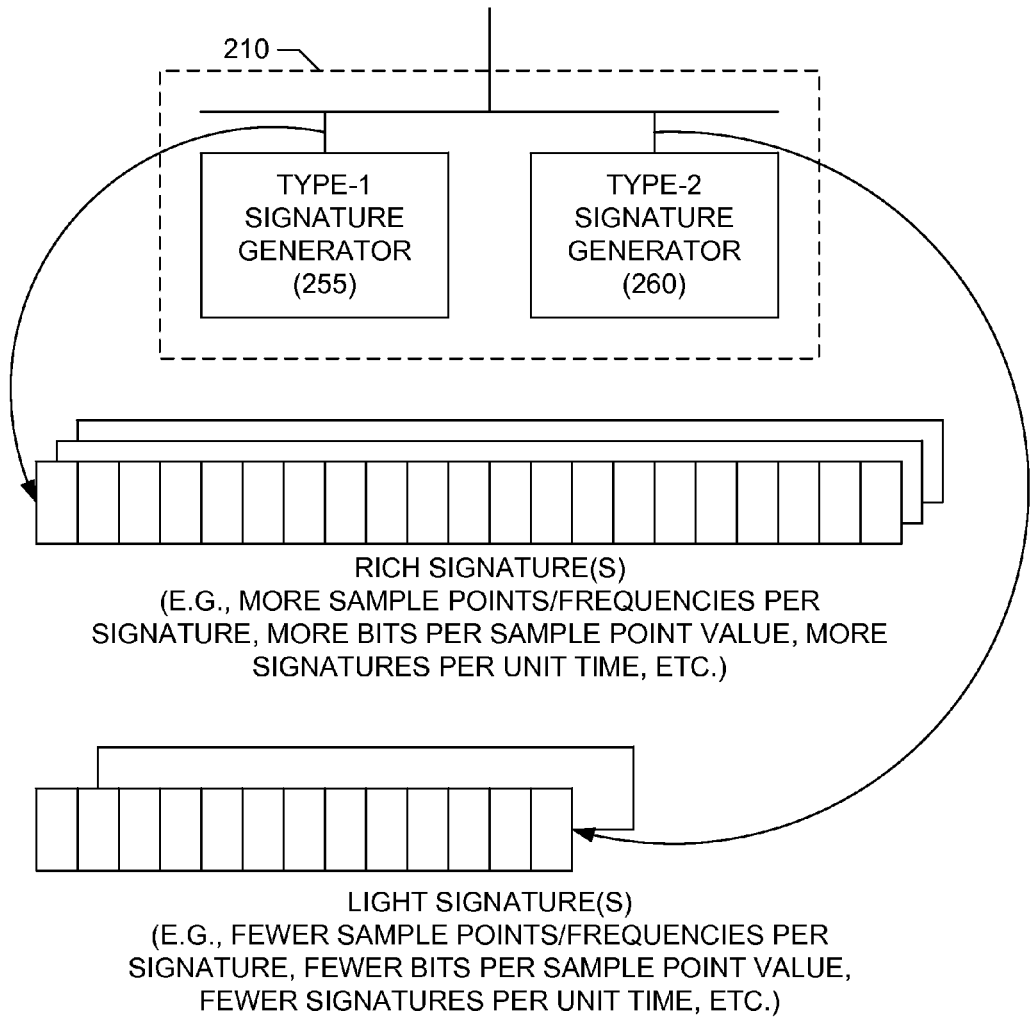
FIG. 2A is a block diagram of an example signature processor that can be used to implement the example meter of FIG. 2.

Some examples of the signature processor 210 can also generate multiple types of signatures from the media signal(s) obtained via the media interface 205. A block diagram of an example implementation of such a signature processor 210 is illustrated in FIG. 2A. In the illustrated example of FIG. 2A, the signature processor 210 includes an example type-1 signature generator 255 and an example type-2 signature generator 260 to generate site signatures of a first type and/or of a second type, respectively, from the monitored media signal(s). The signatures of the first type can correspond to rich, high resolution signatures, whereas the signatures of the second type can correspond to light, low resolution signatures, which are smaller than the rich, high resolution signatures of the first type. In some examples, the signatures of the first type and the signatures of the second type are both generated using the same signaturing procedure, but with the signatures of the first type being generated using a higher data sampling rate (e.g., yielding more sample data points per signature), more bits to represent the sampled media signal values (e.g., yielding more bits per sample point value), more signal frequencies from which the signatures are to be generated, etc., than are used when generating the signatures of the second type. Additionally or alternatively, the type-1 signature generator 255 may generate more type-1 signatures per unit time than the number of type-2 signatures generated per unit time by the type-2 signature generator 260. In this way, the signatures of the first type are generated to have higher resolution than the signatures of the second type and, thus, the signatures of the first type are typically larger (e.g., include more bits of data) than the signatures of the second type. In other examples, the signatures of the first type and the signatures of the second type can be generated using different signaturing procedures, such as a first signaturing procedure that yields higher resolution and, thus, larger signatures than a second signaturing procedure.

The example device meter 125 of FIG. 2 further includes an example signature package receiver 215 to receive a reference signature package from the data processing facility 140 via an example network interface 220. The network interface 220 can be implemented using any networking technology capable of interfacing with the network 135 and capable of sending data to and receiving data from the data processing facility 140. As described above, the reference signature package includes reference signatures representative of reference media predicted to be presented by the media device 110 during a future monitoring interval. For example, the reference signatures included in the reference signature package can include respective subsets (e.g., sequences) of reference signatures representative of respective different reference media predicted for future exposure at the monitored site 105. For example, the respective subsets (e.g., sequences) of reference signatures can be representative of different reference media predicted for presentation at different times, and/or multiple reference media predicted as being candidates for presentation at a same given time.

In some examples, a reference signature package received by the signature package receiver 215 from the data processing facility 140 also includes reference media descriptive information that is descriptive of the different subsets of reference signatures included in the reference signature package. For example, such descriptive information can include identification information to identify the particular reference media represented by a respective subset of the reference signatures. Additionally or alternatively, such descriptive information can include type information specifying whether a respective subset of reference signatures is representative of live reference media or time-shifted reference media. Additionally or alternatively, such descriptive information can include time information specifying time window(s) during which the particular reference media represented by a respective subset of the reference signatures is predicted to be consumed and/or presented. In other words, such time information can specify one or more time windows during which a respective subset of reference signatures are to be used (e.g., are relevant) for media monitoring. In some examples, different subsets of reference signatures representative of different respective reference media can have different time windows of applicability. For example, a first subset of reference signatures representative of first reference media may be applicable (e.g., predicted to be consumed and/or presented) during a first time window (e.g., 7:00 to 8:00 PM, or some other time window), whereas a second subset of reference signatures representative of second reference media may be applicable (e.g., predicted to be consumed and/or presented) during a second time window (e.g., 8:00 to 9:00 PM, or some other time window).

In the illustrated example of FIG. 2, the signature package receiver 215 stores the reference signatures and reference media descriptive information from a received reference signature package in an example cache 225 maintained in an example memory 230. In some examples, the memory 230 also stores metering data to be reported to the data processing facility 140. The memory 230 may be implemented by any type(s) and/or number of storage or memory device(s), database(s), etc., such as the mass storage device 830 and/or the volatile memory 818 included in the example processing system 800 of FIG. 8, which is described in greater detail below.

The example device meter 125 of FIG. 2 also includes an example comparator 235 to compare site signatures generated by the signature processor 210 with subsets of reference signatures selected from the cache 225 by an example reference signature selector 240. The comparator 235 can implement any type(s) and/or number of comparison criteria, such as a cross-correlation value, a Hamming distance, etc., to determine whether site signature(s) and reference signature(s) match or substantially match within a particular tolerance level (e.g., which may be predetermined, specified as a configuration parameter or input, etc.). In the illustrated example, the reference signature selector 240 uses the descriptive information included with the reference signature package(s) provided by the data processing facility 140 and stored in the cache 225 to select one or more subsets of reference signatures for comparison with the site signatures generated by the signature processor 210 for a given period of time. For example, the reference signature selector 240 can evaluate time information included in the cached descriptive information and specifying time window(s) during which each respective subset of the reference signatures representative of respective reference media is predicted to be consumed and/or presented at the monitored site 105 to determine when each respective subset of reference signatures is to be selected and used for signature matching.

To report metering data characterizing the media presented by the media device 100 and, thus, presumed to have been consumed at the monitored site 105, the example device meter 125 of FIG. 2 includes an example metering data reporter 245. The metering data reporter 245 can report metering data at the conclusion of a given monitoring interval, in real-time, using a combination of real-time and the batch reporting at the end of a monitoring interval, etc. For example, a monitoring interval can correspond to, for example, a daily interval, weekly interval, etc., which is divided into monitoring time periods, such as 15 minute periods, 30 minute periods, 1 hour periods, etc., the latter of which may correspond to the time window(s) specified in the time information included in the received reference signature package(s). In such example, the metering data reporter 245 prepares reporting data for one or more, or each, time period, including: (i) media identification information indicating which subset(s) of cached reference media signatures, if any, matched the site signatures generated by the signature processor 210 for the given time period (e.g., to identify the matching reference media), (ii) duration information indicating the duration of the matching signatures (e.g., to indicate the duration of presenting and/or consuming the matching reference media at the monitored site 105), etc. In some examples, when the set of site signatures generated by the signature processor 210 fails to match any of the subset(s) of cached reference media signatures specified for use during a given time period, the metering data reporter 245 reverts to reporting the site signatures generated by the signature processor 210 for the given time period. In such examples, prediction was unsuccessful and, thus, the data processing facility 140 can compare the reported site signatures with a larger reference signature library maintained by the data processing facility 140 to thereby identify the reference media presented and/or consumed during the given period of time.

In some examples, for a given monitoring time period, the metering data reporter 245 reports different media identification information depending upon the descriptive information included with the subset of reference signatures that matched the set of site signatures for that time period. For example, if the descriptive information associated with the particular matching subset of reference signatures for the given time period indicates that the reference media represented by the matching reference signatures is live media, then it may be sufficient to include an indication that the predicted live viewing for the given time period occurred, rather than including specific media identification information for the given period (e.g., if only one possible live media source is predicted for the given time period). As another example, if the descriptive information associated with the particular matching subset of reference signatures for the given time period indicates that the reference media represented by the matching reference signatures is time-shifted media, then the media identification information included in the metering data may include a specific reference media identifier for the given period (e.g., if multiple time-shifted media sources are predicted as possible for the given time period). Also, to reduce the size of the reported metering data, the metering data reporter 245 may include a match success indication for each time period in which a match between the site signatures and cached (i.e., predicted) reference signatures occurred, and further include media identification information identifying the matching reference signatures only in cases of possible ambiguity, such as only for those time period(s) for which multiple different subsets of reference signatures (representative of different reference media) have time windows that overlap those time period(s)).

As noted above, in some examples, the signature processor 210 supports generation of multiple types of signatures (e.g., during a given time period) such that a first type corresponds to rich, high resolution signatures, whereas a second type corresponds to light, low resolution signatures. In such examples, the reference signatures included in the reference signature package received from the data processing facility 140 and stored in the cache 225 can correspond to the light signatures of the second type. Use of such light signatures can reduce the size of the reference signature package while yielding acceptable matching performance if, for example, the number of predicted reference media sources for a given time period is small. Furthermore, in such examples, the signature processor 210 may also generate the rich signatures in case the light signatures fail to match any of the reference signatures specified for the given monitoring time period. In such examples, the metering data reporter 245 can include the rich site signatures in the reported metering data to enable the data processing facility 140 to compare the site signatures against a possibly large library of reference media with acceptable performance.

Figure 3:
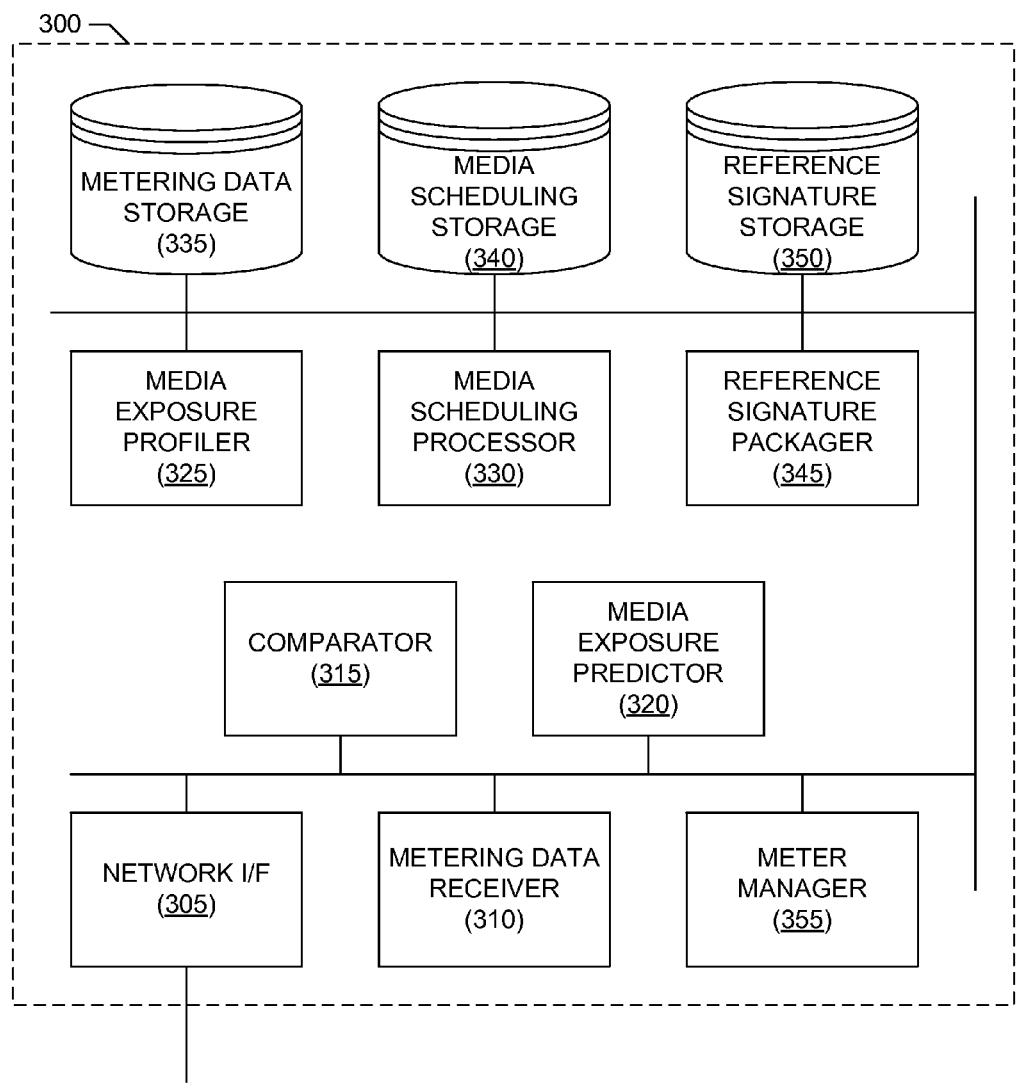
FIG. 3 is a block diagram of an example data facility processor that can be used to implement the example audience measurement system of FIG. 1.

A block diagram of an example data facility processor 300 that may be used to implement predictive signature caching in the example data processing facility 140 of FIG. 1 is illustrated in FIG. 3. The example data facility processor 300 of FIG. 3 includes an example network interface 305 implemented using any networking technology capable of interfacing with the network 135 and capable of sending data to and receiving data from the device meter 125. The example data facility processor 300 of FIG. 4 also includes an example metering data receiver 310 to receive, via the network interface 305, the metering data reported by the device meter 125 in any appropriate data format according to any appropriate protocol. As described above, the metering data reported received by the metering data receiver 310 from a device meter 125 for a particular monitored site 105 can include media identification information identifying the reference media presented and/or consumed at the monitored site 105, duration information indicating the time(s) when the reported reference media was presented and/or consumed at the monitored site 105, as well as the duration of such presentation and/or viewing.

In some examples, the metering data received by the metering data receiver 305 can include site signatures reported by the device meter 126 and corresponding to time period(s) during which the site signatures 125 generated by the meter 125 failed to match the cached reference signatures for the reference media predicted for presentation and/or consumption during those time period(s). Accordingly, the example data facility processor 300 of FIG. 3 further includes an example comparator 315 to compare the site signatures received from the device meter 125 with reference signatures representative of the collection of reference media known to the data processing facility 140. Similar to the comparator 235 of FIG. 2, the comparator 315 of FIG. 3 can implement any type(s) and/or number of comparison criteria, such as a cross-correlation value, a Hamming distance, etc., to determine whether a monitored signature and a reference signature match or substantially match within a particular tolerance level (e.g., which may be predetermined, specified as a configuration parameter or input, etc.).

To predict future media presentation and/or consumption associated with the media device 110 at the monitored site 105, the example data facility processor 300 of FIG. 3 includes an example media exposure predictor 320, an example media exposure profiler 325 and an example media scheduling processor 330. In the illustrated example, the media exposure predictor 320 processes historical metering data previously received from the device meter 125 that is monitoring media presented by the media device 110 at the monitored site 105 to predict the media exposure that is to occur during a future monitoring interval at the monitored site 105. For example, the metering data received by the metering data receiver 305 from device meters, including the device meter 125 for the monitored site 105, can be stored in an example metering data storage 335 of the data facility processor 300. In such examples, the media exposure predictor 320 processes the historical metering data stored in the metering data storage 335 for the device meter 125 to predict the media that is to be presented by the media device 110 being monitored by the device meter 125 and, thus, predicted to be consumed at the monitoring site 105, during the next or some future monitoring interval.

In some examples, the media exposure predictor 320 uses the historical data for a particular device meter 125 to determine one or more media exposure patterns associated with media exposure at the meter's monitored site 105. In such examples, the media exposure predictor 320 can invoke the media exposure profiler 325 to ascertain such profiles from the historical data for the particular device meter 125. For example, the media exposure profiler 325 can process the historical metering data reported by the device meter 125 for the monitored site 105 to determine the television series, movie genres, music artists, etc., and/or other identifying characteristics associated with media previously reported as having been presented and/or consumed at the monitored site 105. The media exposure profiler 325 can then use any type of pattern recognition analysis to ascertain patterns of media exposure from the historical metering data. For example, the media exposure profiler 325 can determine patterns of television series episodes that have been presented and/or consumed at the monitored site 105 and a likelihood of a future occurrence of an episode of a series being presented and/or consumed. Similarly, the media exposure profiler 325 can use any type of pattern recognition analysis to ascertain the likelihood of different movies, songs, etc., being presented and/or consumed at the monitored site 105.

For example, as metering data is collected by a device meter 125 for a media device 110, recurring patterns of media presentation (and, thus, consumption) associated with that device can be identified. Patterns can emerge for the times in which television viewing occurs, what programs are viewed, and if the viewing is done as the program is broadcast, or is done in a time-shifted mode. By building a profile for each device meter 125 (and, thus, for each device 110 and corresponding monitored site 105) that includes respective media usage pattern(s), the profile can allow the media exposure predictor 320 to predict future viewing. For example, based on knowledge of upcoming scheduled media broadcasts, upcoming availability of streaming/downloadable media, etc., the profile data can be used to create a schedule of predicted media exposure for a monitored media device, such as the media device 110. In cases where a monitored site 105 includes multiple media devices 110, patterns of media presentation and/or consumption by media device can also be produced.

In some examples, the media exposure profiler 325 determines different types of media exposure patterns for different types of media predicted for exposure at the monitored site 105. For example, the media exposure profiler 325 can determine a live media exposure profile and a time-shifted media exposure profile associated with the media device 110 being monitoring by the device meter 125. In such examples, the live media exposure profile can specify the patterns of live media content presented by the media device 125 and, thus, presumed to have been consumed at the monitored site 105 in the past, such as in the form of days/times of the week when live media programs (e.g., television programs, radio programs, etc.) are presented (e.g., viewed, heard, etc.) on a regular basis, along with information identifying these live programs. Such live media exposure profiles can then be used to ascertain a pattern of live media exposure, such as likely time(s) of the day and day(s) of the week when live media is likely to be presented in the future, and/or live media programs for which future episodes are likely to be presented and/or consumed at the monitored site 105, etc. For comparison, the time-shifted media exposure profile associated with the media device 110 being monitoring by the device meter 125 can specify the patterns of time-shifted media content presented by the media device 125 and, thus, consumed at the monitored site 105. For example, the time-shifted media exposure profile can specify the days/times of the week when time-shifted media (e.g., recorded television programs, recorded radio programs, streaming on-demand content, etc.) are recorded/downloaded on a regular basis, the elapsed time(s) between media recording/download and playback (e.g., on average, for specific types/genres of media, etc.), etc., from which patterns of time-shifted media exposure can be determined. Any number(s) and/or type(s) of media exposure patterns can be determined according to any appropriate technique(s) by the media exposure profiler 325, for use by the media exposure predictor 320.

In some example, the media exposure predictor 320 compares the profile containing the media exposure pattern(s) for a given device meter 125 to media scheduling/availability data to predict the future media presentation/exposure associated with the respective media device 110 and monitored site 105 being monitored by the meter 125. In such examples, the media scheduling processor 330 processes media scheduling/availability data stored in an example media scheduling storage 340 to determine a media availability schedule for the next, or some other future, monitoring interval. For example, the media scheduling storage 340 may store media scheduling data (e.g., broadcast scheduling data) obtained from one or more broadcast service providers (e.g., television, cable and/or satellite service providers), one or more electronic program guide (EPG) services, etc. Additionally or alternatively, the media scheduling storage 340 may store media availability data (e.g., online streaming/download availability) in the form of media playlists and/or the like obtained from one or more online media service providers (e.g., streaming video providers, streaming audio providers, video/audio download services, etc.), etc. Additionally or alternatively, the media scheduling storage 340 may store schedule(s) of commercials in rotation on each available network, media source, etc., to enable the scheduling of commercials, advertisement, etc., to be determined. The media scheduling processor 330 then retrieves the media scheduling/availability data for a given future monitoring interval to determine a schedule of media availability (e.g., by time period, source, etc.), that can be compared with the media exposure patterns(s) stored in the profiles determined by the media exposure profiler 325.

Using any appropriate comparison technique or techniques, the media exposure predictor 320 compares the media exposure profile(s) included in the profile determined by the media exposure profiler 325 for a particular device meter, such as the device meter 125, with the schedule of media availability determined by the media scheduling processor 330 to predict the reference media that is likely to be presented at the monitored site 105 during the next, or some other future, monitoring interval. After predicting the reference media that is likely to be presented at the monitored site 105 during the future monitoring interval, the media exposure predictor 320 invokes an example reference signature packager 345 included in the example data facility processor 300 of FIG. 3 to prepare a package of reference signatures representative of this reference media. In the illustrated example, the reference signature packager 345 retrieves the reference signatures from an example reference signature storage 350 storing respective subsets (e.g., sequences) of reference signatures representative of respective reference media known to the data facility processor 300. The data facility processor 300 can obtain the set (e.g., sequence) of reference signatures for particular reference media in any appropriate manner, such as from a provider of the reference media, but monitoring media broadcasts, etc.

In some examples, the reference signature storage 350 can store multiple types of signatures for a particular reference media. For example, the reference signature storage 350 may store a set (e.g., sequence) of rich reference signatures, as described above, and a set (e.g., sequence) of light reference signatures, as described above, for a particular reference media. In such examples, the reference signature packages determined by the reference signature packager 350 may include light reference signatures representative of the reference media to be represented in the package, whereas the rich reference signatures may be used by the comparator 315 for comparison with reported site signatures, as described above For a given device meter 125 and future monitoring interval, the reference signature packager 345 prepares a reference signature package containing the respective subsets (e.g., sequences) of reference signatures (e.g., light reference signatures) representative of the respective reference media predicted for presentation and/or consumption at the associated monitored site 105 during the future monitoring interval. The reference signature package may also contain descriptive information, as described above. For example, such descriptive information can include identification identifying the respective reference media represented by each subset of reference signatures included in the package, type information specifying the type of reference media (e.g., live or time-shifted) represented by each subset of reference signatures included in the package, time information specifying one or more time windows during which the respective sets of reference signatures are to be used (e.g., are relevant) for media monitoring based on predictive signature caching, etc.

The example data facility processor 300 of FIG. 3 also includes an example meter manager 355 to perform management of device meters, such as the device meter 125. For example, the meter manager 355 may use the network interface 305 to connect with and program configuration information into the device meter 125, such as monitoring time intervals, metering data reporting times/intervals, device and/or site identification information, etc. Additionally or alternatively, in the illustrated example, the meter manager 355 causes the reference signature package(s) determined by the reference signature packager 345 for the device meter 125 to be downloaded (e.g., via the network interface 305) to the device meter 125 prior to the start of the monitoring interval(s) during which the reference signature package(s) is(are) to be used.

In the illustrated example of FIG. 3, the metering data storage 335, the media scheduling storage 340 and the reference signature storage 350 can be implemented by any number and/or type(s) of storage or memory device(s), database(s), etc., such as the mass storage device 830 and/or the volatile memory 818 included in the example processing system 800 of FIG. 8, which is described in greater detail below. Furthermore, the metering data storage 335, the media scheduling storage 340 and the reference signature storage 350 can be implemented by the same storage or memory device, or two or more different storage or memory devices.

While example manners of implementing the audience measurement system 100 have been illustrated in FIGS. 1-3, one or more of the elements, processes and/or devices illustrated in FIGS. 1-3 may be combined, divided, re-arranged, omitted, eliminated and/or implemented in any other way. Further, the example device meter 125, the example data processing facility 140, the example media interface 205, the example signature processor 210, the example signature package receiver 215, the example network interface 220, the example cache 225, the example memory 230, the example comparator 235, the example reference signature selector 240, the example metering data reporter 245, the example type-1 signature generator 255, the example type-2 signature generator 260, the example data facility processor 300, the example network interface 305, the example metering data receiver 310, the example comparator 315, the example media exposure predictor 320, the example media exposure profile 325, the example media scheduling processor 330, the example metering data storage 335, the example media scheduling storage 340, the example reference signature packager 345, the example reference signature storage 350, the example meter manager 355 and/or, more generally, the example audience measurement system 100 may be implemented by hardware, software, firmware and/or any combination of hardware, software and/or firmware. Thus, for example, any of the example device meter 125, the example data processing facility 140, the example media interface 205, the example signature processor 210, the example signature package receiver 215, the example network interface 220, the example cache 225, the example memory 230, the example comparator 235, the example reference signature selector 240, the example metering data reporter 245, the example type-1 signature generator 255, the example type-2 signature generator 260, the example data facility processor 300, the example network interface 305, the example metering data receiver 310, the example comparator 315, the example media exposure predictor 320, the example media exposure profile 325, the example media scheduling processor 330, the example metering data storage 335, the example media scheduling storage 340, the example reference signature packager 345, the example reference signature storage 350, the example meter manager 355 and/or, more generally, the example audience measurement system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example audience measurement system 100, the example device meter 125, the example data processing facility 140, the example media interface 205, the example signature processor 210, the example signature package receiver 215, the example network interface 220, the example cache 225, the example memory 230, the example comparator 235, the example reference signature selector 240, the example metering data reporter 245, the example type-1 signature generator 255, the example type-2 signature generator 260, the example data facility processor 300, the example network interface 305, the example metering data receiver 310, the example comparator 315, the example media exposure predictor 320, the example media exposure profile 325, the example media scheduling processor 330, the example metering data storage 335, the example media scheduling storage 340, the example reference signature packager 345, the example reference signature storage 350 and/or the example meter manager 355 are hereby expressly defined to include a tangible computer readable storage medium such as a memory, digital versatile disk (DVD), compact disk (CD), Blu-ray disc™, etc., storing such software and/or firmware. Further still, the example audience measurement system 100 of FIGS. 1-3 may include one or more elements, processes and/or devices in addition to, or instead of, those illustrated in FIGS. 1-3, and/or may include more than one of any or all of the illustrated elements, processes and devices.

Flowcharts representative of example machine readable instructions for implementing the example audience measurement system 100, the example device meter 125, the example data processing facility 140, the example media interface 205, the example signature processor 210, the example signature package receiver 215, the example network interface 220, the example cache 225, the example memory 230, the example comparator 235, the example reference signature selector 240, the example metering data reporter 245, the example type-1 signature generator 255, the example type-2 signature generator 260, the example data facility processor 300, the example network interface 305, the example metering data receiver 310, the example comparator 315, the example media exposure predictor 320, the example media exposure profile 325, the example media scheduling processor 330, the example metering data storage 335, the example media scheduling storage 340, the example reference signature packager 345, the example reference signature storage 350 and/or the example meter manager 355 are shown in FIGS. 4-7. In these examples, the machine readable instructions represented by each flowchart may comprise one or more programs for execution by a processor, such as the processor 812 shown in the example processing system 800 discussed below in connection with FIG. 8. The one or more programs, or portion(s) thereof, may be embodied in software stored on a tangible computer readable storage medium such as a CD-ROM, a floppy disk, a hard drive, a digital versatile disk (DVD), a Blu-ray disc™, or a memory associated with the processor 812, but the entire program or programs and/or portions thereof could alternatively be executed by a device other than the processor 812 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 4-7 may be implemented manually. Further, although the example machine readable instructions are described with reference to the flowcharts illustrated in FIGS. 4-7, many other methods of implementing the example audience measurement system 100, the example device meter 125, the example data processing facility 140, the example media interface 205, the example signature processor 210, the example signature package receiver 215, the example network interface 220, the example cache 225, the example memory 230, the example comparator 235, the example reference signature selector 240, the example metering data reporter 245, the example type-1 signature generator 255, the example type-2 signature generator 260, the example data facility processor 300, the example network interface 305, the example metering data receiver 310, the example comparator 315, the example media exposure predictor 320, the example media exposure profile 325, the example media scheduling processor 330, the example metering data storage 335, the example media scheduling storage 340, the example reference signature packager 345, the example reference signature storage 350 and/or the example meter manager 355 may alternatively be used. For example, with reference to the flowcharts illustrated in FIGS. 4-7, the order of execution of the blocks may be changed, and/or some of the blocks described may be changed, eliminated, combined and/or subdivided into multiple blocks.

As mentioned above, the example processes of FIGS. 4-7 may be implemented using coded instructions (e.g., computer readable instructions) stored on a tangible computer readable storage medium such as a hard disk drive, a flash memory, a read-only memory (ROM), a CD, a DVD, a cache, a random-access memory (RAM) and/or any other storage device or storage disk in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk, and to exclude propagating signals. Additionally or alternatively, the example processes of FIGS. 4-7 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device and/or storage disk, and to exclude propagating signals. Also, as used herein, the terms "computer readable" and "machine readable" are considered equivalent. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 4:
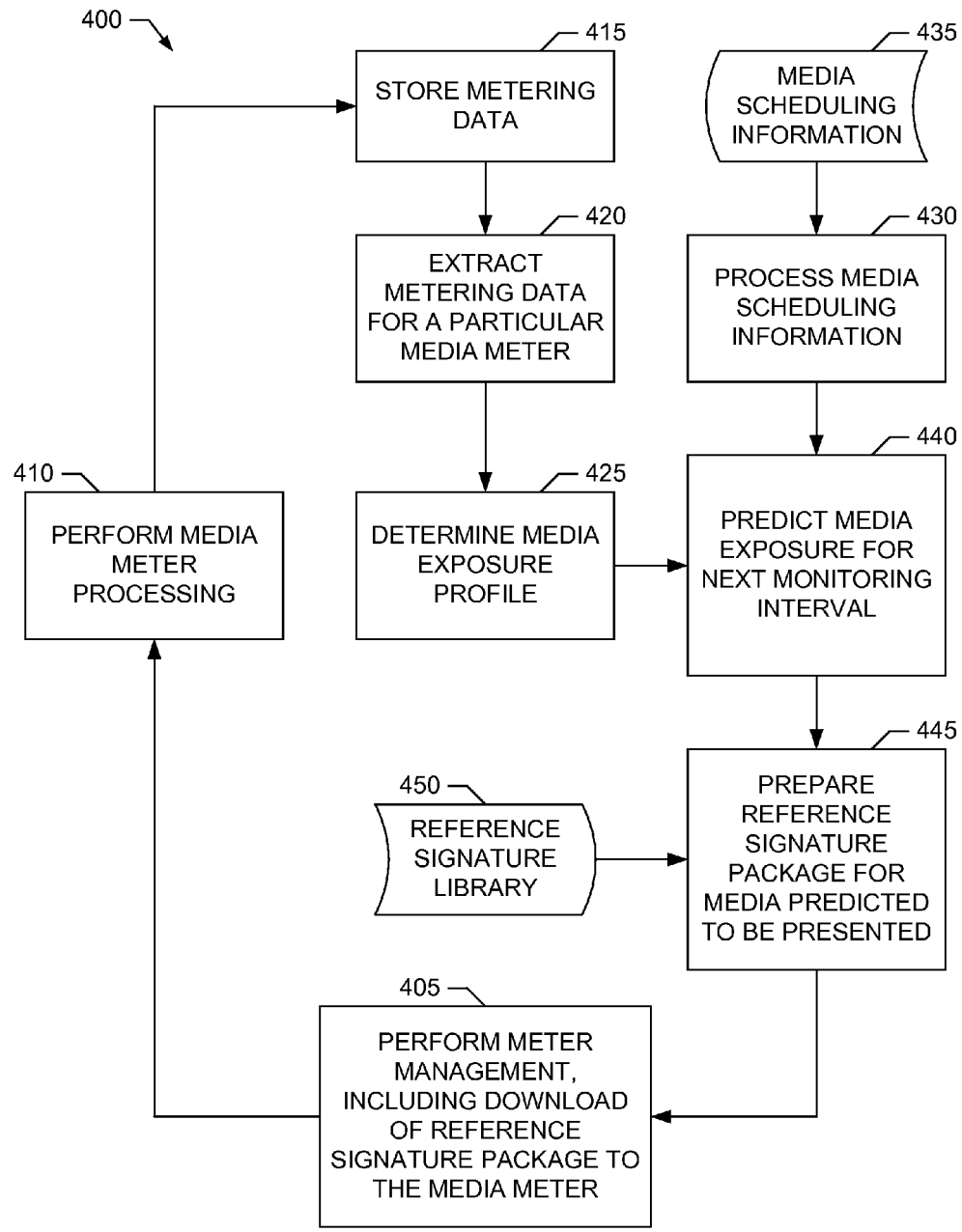
FIG. 4 is a flowchart representative of example machine readable instructions that may be executed to implement media monitoring based on predictive signature caching in the example audience measurement system of FIG. 1.
Figure 5:
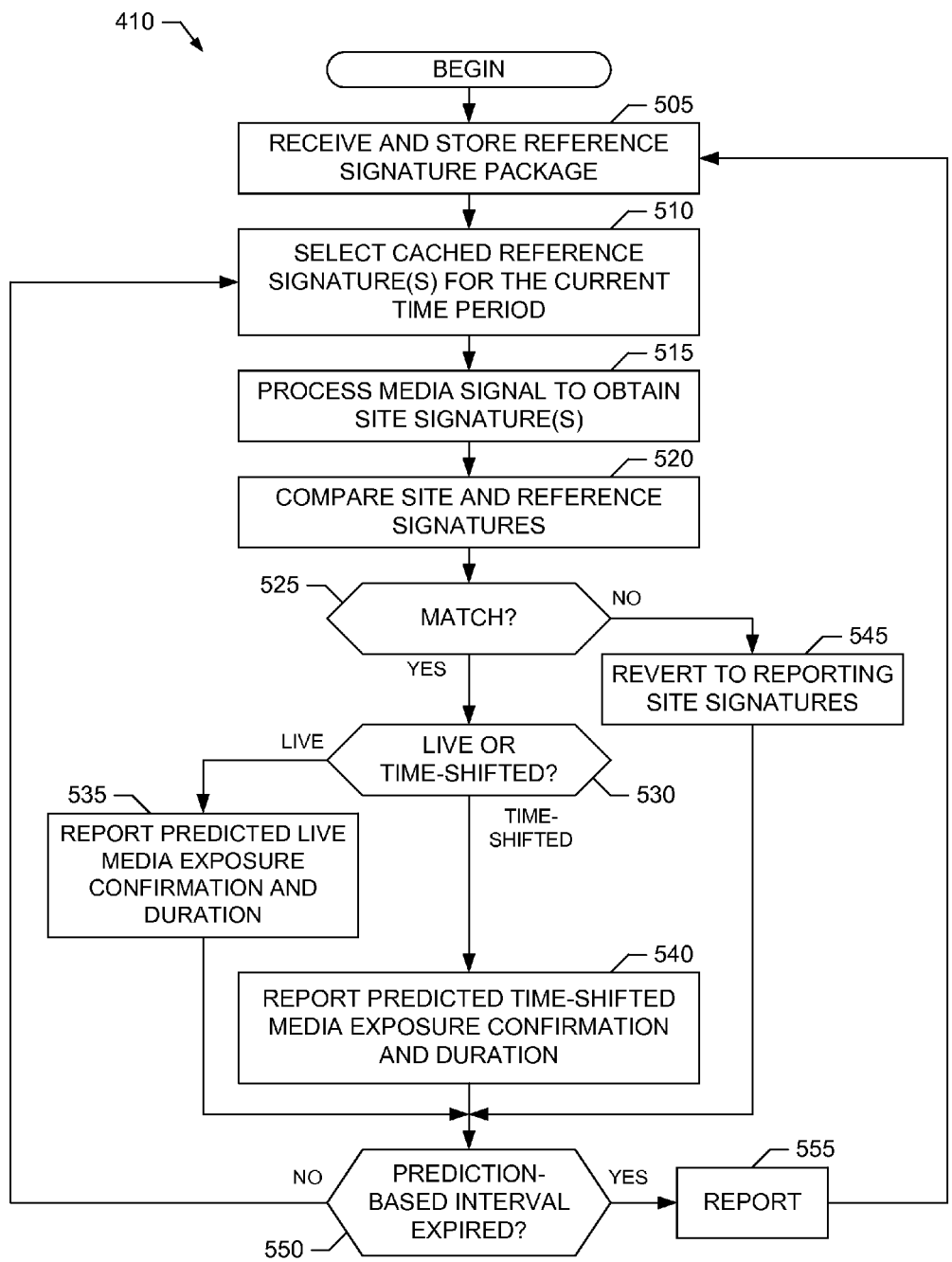
FIG. 5 is a flowchart representative of example machine readable instructions that may be executed to implement the example meter of FIG. 2.

Example machine readable instructions 400 that may be executed to implement the example audience measurement system 100 of FIG. 1 are represented by the flowchart shown in FIG. 4. For convenience, and without loss of generality, execution of the example machine readable instructions 400 is described from the perspective of the example device meter 125 of FIG. 1 being implemented according to the example of FIG. 2, and the example data processing facility 140 of FIG. 1 including an example data facility processor 300 as illustrated in FIG. 3. With reference to the preceding figures and associated descriptions, the description of the execution of the machine readable instructions 400 of FIG. 4 begins, for convenience, at block 405 at which the data facility processor 300 of the data processing facility 140 performs meter management, including downloading of one or more reference signature packages to the device meter 125. At block 410, the device meter 125 monitors the media device 110 at the monitored site 105 using predictive signature caching based on the reference signature package(s) received previously from the data processing facility 140 via the processing at block 405. Example machine readable instructions that can be executed to perform the processing at block 410 are illustrated in FIG. 5, which is described in greater detail below.

Figure 6:
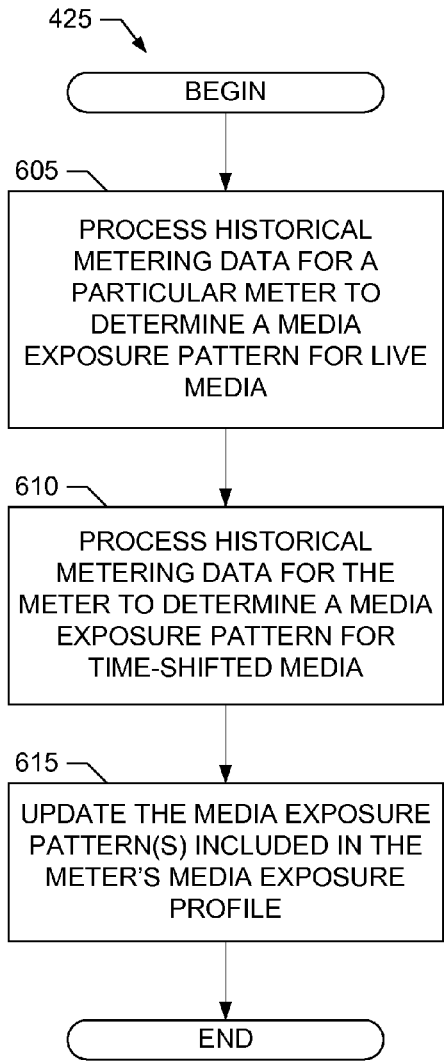
FIG. 6 is a flowchart representative of first example machine readable instructions that may be executed to implement the example data facility processor of FIG. 3.

At block 415, the metering data receiver 310 of the data facility processor 300 receives metering data reported by the device meter 125 and stores the reported metering data in the metering data storage 335. At block 420, the media exposure profiler 325 of the data facility processor 300 extracts historical metering data associated with the device meter 125 from the metering data storage 335. At block 425, the media exposure profiler 325 determines, as described above, a media exposure profile for the device meter 125, which includes one or more media exposure patterns representative of media exposure and/or consumption behavior at the monitored site 105 that is monitored by the device meter 125. Example machine readable instructions that may be executed to perform the processing at block 425 are illustrated in FIG. 6, which is described in greater detail below.

Figure 7:
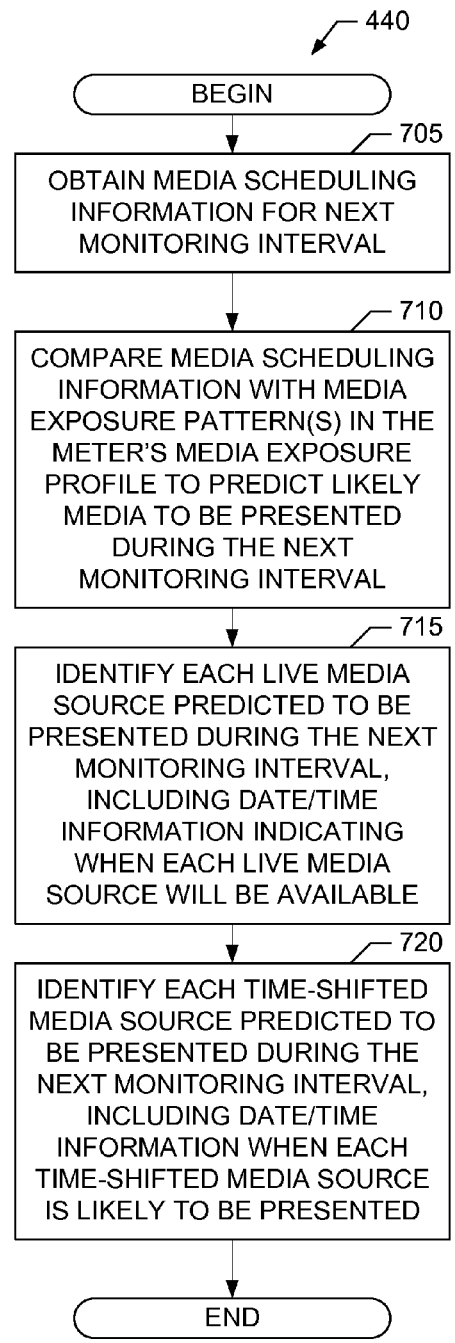
FIG. 7 is a flowchart representative of second example machine readable instructions that may be executed to implement the example data facility processor of FIG. 3.

At block 430, the media scheduling processor 330 of the data facility processor 300 processes media scheduling/availability data 435 stored in the media scheduling storage 340 to determine a media availability schedule for the next, or some other future, monitoring interval, as described above. At block 440, the media exposure predictor 320 of the data facility processor 300 compares the media availability schedule determined at block 430 for the next, or some other future, monitoring interval with the media exposure patterns included in the profile determined at block 425 to predict the reference media that is likely to be presented and/or consumed at the monitored site 105 during the next, or some other future, monitoring interval, as described above. Example machine readable instructions that may be executed to perform the processing at block 440 are illustrated in FIG. 7, which is described in greater detail below.

At block 445, the reference signature packager 345 of the data facility processor 300 prepares a package of reference signatures representative of the reference media predicted at block 440 for presentation and/or consumption at the monitored site 105 during the next, or some other future, monitoring interval. As described above, the reference signature packager 345 retrieves the appropriate subsets (e.g., sequences) of reference signatures representative of respective reference media to be represented in the reference signature package from a reference signature library 450 stored in the reference signature storage 350. Then, processing returns to block 405 for another iteration in which the reference signature package determined at block 445 is downloaded to the device meter 105 for use during a subsequent monitoring interval. The iterative processing of the example machine readable instructions 400 then continues according to the preceding description.

Example machine readable instructions 410 that may be executed to implement the example device meter 125 of FIGS. 1 and/or 2, and/or the processing at block 410 of FIG. 4, are represented by the flowchart shown in FIG. 5. For convenience, and without loss of generality, execution of the example machine readable instructions 410 is described from the perspective of the example device meter 125 of FIG. 1 being implemented according to the example of FIG. 2. With reference to the preceding figures and associated descriptions, execution of the machine readable instructions 410 of FIG. 5 begins at block 505 at which the signature package receiver 215 of the device meter 125 receives a reference signature package for a next, or some other future, monitoring interval from the data processing facility 140. At block 505, the signature package receiver 215 also stores the received reference signature package in the cache 225 of the memory 230, as described above.

At block 510, the reference signature selector 240 of the device meter 125 selects subset(s) of reference signatures from the cache 230 for comparison against site signatures generated for a given (e.g., current) monitored time period. The subset(s) of reference signatures selected at block 510 represent respective reference media predicted for presentation by the monitored media device 110 during the current monitored time period. As described above, the reference signature selector 240 can select the appropriate subset(s) of reference signatures using time information stored in the cache 230 and provided with the reference signature package associated with the current monitoring interval. At block 515, the signature processor 210 of the device meter 125 processing media signal(s) obtained via the media interface 205 for the monitored media device 110 to generate site signatures for the current time period.

At block 520, the comparator 235 of the device meter 125 compares the subset(s) of reference signatures selected at block 510 with the site signatures generated at block 515. If a match is detected (block 525), the metering data reporter 245 of the device meter 125 processes the descriptive information stored in the cache 230 to determine whether the matching reference signatures represent live or time-shifted media reference media predicted for presentation and/or consumption during the current time period. If the matching reference signatures represent live reference media (block 530), then at block 535 the metering data reporter 245 includes information in the metering data to be reported for the current time period indicating that the live media presentation and/or consumption predicted for the current time period occurred, as well as the duration over which such presentation and/or consumption matched the prediction. If, however, the matching reference signatures represent time-shifted reference media (block 530), then at block 540 the metering data reporter 245 includes information in the metering data to be reported for the current time period indicating that the time-shifted media presentation and/or consumption predicted for the current time period occurred, as well as the duration over which such presentation and/or consumption matched the prediction. As described above, in some examples, the information reported at block 540 for predicted time-shifted media presentation and/or consumption may be different (e.g., may also include media identification information) from the information reported at block 535 for predicted live media presentation and/or consumption.

Returning to block 525, if the comparator determines that the site signatures generated at block 515 fail to match any of the subset(s) of reference signatures selected at block 510, then processing proceeds to block 545, which corresponds to the case in which the reference media predicted for the given (e.g., current) time period was not presented and/or consumed. Therefore, at block 545, the metering data reporter 245 reverts to reporting the site signatures generated by the signature processor 210 at block 515 for the given (e.g., current) time period, as described above. After processing at block 535, 540 or 545 completes, at block 550 the device meter 125 determines whether the current prediction-based monitoring interval has expired. If the monitoring interval has not expired (block 550), then control returns to block 510 and blocks subsequent thereto at which the device meter 125 performs media monitoring based on predictive signature caching for a subsequent (e.g., the next) time period in the current monitoring interval. If, however, the monitoring interval has expired (block 550), then the metering data reporter 245 of the device meter 125 reports the metering data for the expired monitoring interval to the data processing facility 140. Control then returns to block 505 and blocks subsequent thereto at which the device meter 125 receives the reference signature package for use in performing media monitoring based on predictive signature caching during the next monitoring interval.

Example machine readable instructions 425 that may be executed to implement the media exposure profiler 325 of the example data facility processor 300 of FIG. 3, and/or the processing at block 425 of FIG. 4, are represented by the flowchart shown in FIG. 6. With reference to the preceding figures and associated descriptions, execution of the machine readable instructions 425 of FIG. 6 begins at block 605 at which the media exposure profiler 325 processes historical metering data stored in the metering data storage 335 to determine, as described above, a first media exposure pattern associated with live media previously presented via the media device 110 being monitored by the device meter 125 (and, thus, inferred to have been consumed at the monitored site 105). At block 610, the media exposure profiler 325 processes the historical metering data stored in the metering data storage 335 to determine, as described above, a second media exposure pattern associated with time-shifted media previously presented via the media device 110 being monitored by the device meter 125 (and, thus, inferred to have been consumed at the monitored site 105). At block 615, the media exposure profiler 325 uses the patterns determined at blocks 605 and 610 to update, in any appropriate manner, the live and time-shifted media exposure patterns stored in the media exposure profile for the device meter 125.

Example machine readable instructions 440 that may be executed to implement the media exposure predictor 320 of the example data facility processor 300 of FIG. 3, and/or the processing at block 440 of FIG. 4, are represented by the flowchart shown in FIG. 7. With reference to the preceding figures and associated descriptions, execution of the machine readable instructions 440 of FIG. 7 begins at block 705 at which the media exposure predictor 320 obtains a media availability schedule, which corresponds to the next, or some other future, monitoring interval from, for example, the media scheduling processor 330. At block 710, the media exposure predictor 320 compares, as described above, the media availability schedule obtained at block 705 with one or more media exposure pattern(s) determined by the media exposure predictor 320 of the data facility processor 300 as being representative of the media presentation and/or consumption behavior associated with monitored site 105 being monitored by the device meter 125. Based on the comparison, at block 715, the media exposure predictor 320 identifies any live reference media that is predicted to be presented and/or consumed at the monitored site 105 associated with the device meter 125 during the next, or some other future, monitoring interval. At block 715, the media exposure predictor 320 also determines time information specifying time window(s), within the next (or future) monitoring interval, during which such live reference media is predicted to be presented and/or consumed at the monitored site 105 associated with the device meter 125. Furthermore, based on the comparison performed at block 710, at block 720, the media exposure predictor 320 identifies any time-shifted reference media that is predicted to be presented and/or consumed at the monitored site 105 associated with the device meter 125 during the next, or some other future, monitoring interval. At block 720, the media exposure predictor 320 also determines time information specifying time window(s), within the next (or future) monitoring interval, during which such time-shifted reference media is predicted to be presented and/or consumed at the monitored site 105 associated with the device meter 125

Figure 8:
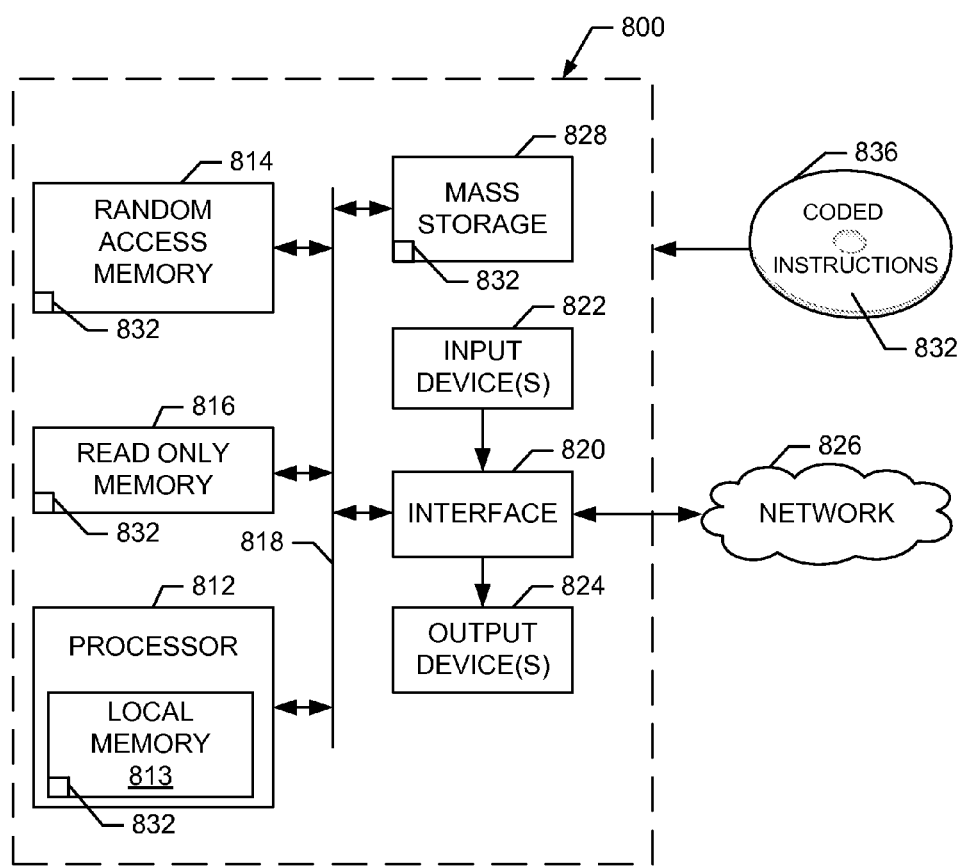
FIG. 8 is a block diagram of an example processing system that may execute the example machine readable instructions of FIGS. 4-6 and/or 7 to implement the example audience measurement system of FIG. 1, the example meter of FIG. 2, the example signature processor of FIG. 2A and/or the example data facility processor of FIG. 3.

FIG. 8 is a block diagram of an example processing system 800 capable of executing the instructions of FIGS. 4-7 to implement the example audience measurement system 100, the example device meter 125, the example data processing facility 140, the example media interface 205, the example signature processor 210, the example signature package receiver 215, the example network interface 220, the example cache 225, the example memory 230, the example comparator 235, the example reference signature selector 240, the example metering data reporter 245, the example type-1 signature generator 255, the example type-2 signature generator 260, the example data facility processor 300, the example network interface 305, the example metering data receiver 310, the example comparator 315, the example media exposure predictor 320, the example media exposure profile 325, the example media scheduling processor 330, the example metering data storage 335, the example media scheduling storage 340, the example reference signature packager 345, the example reference signature storage 350 and/or the example meter manager 355 of FIGS. 1-3. The processing system 800 can be, for example, a server, a personal computer, a mobile device (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 800 of the instant example includes a processor 812. For example, the processor 812 can be implemented by one or more microprocessors and/or controllers from any desired family or manufacturer.

The processor 812 includes a local memory 813 (e.g., a cache) and is in communication with a main memory including a volatile memory 814 and a non-volatile memory 816 via a link 818. The link 1518 may be implemented by a bus, one or more point-to-point connections, etc., or a combination thereof. The volatile memory 814 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processing system 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, a trackbar (such as an isopoint), a voice recognition system and/or any other human-machine interface.

One or more output devices 824 are also connected to the interface circuit 820. The output devices 824 can be implemented, for example, by display devices (e.g., a liquid crystal display, a cathode ray tube display (CRT)), a printer and/or speakers. The interface circuit 820, thus, typically includes a graphics driver card.

The interface circuit 820 also includes a communication device, such as a modem or network interface card, to facilitate exchange of data with external computers via a network 826 (e.g., an Ethernet connection, a digital subscriber line (DSL), a telephone line, coaxial cable, a cellular telephone system, etc.).

The processing system 800 also includes one or more mass storage devices 828 for storing machine readable instructions and data. Examples of such mass storage devices 828 include floppy disk drives, hard drive disks, compact disk drives and digital versatile disk (DVD) drives.

Coded instructions 832 corresponding to the instructions of FIGS. 4-7 may be stored in the mass storage device 828, in the volatile memory 814, in the non-volatile memory 816, in the local memory 813 and/or on a removable storage medium, such as a CD or DVD 836.

As an alternative to implementing the methods and/or apparatus described herein in a system such as the processing system of FIG. 8, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to monitor media presented at a monitored site via a meter at the monitored site, the method comprising:
   selecting, at the meter, a first set of reference signatures representative of reference media predicted to be presented at the monitored site during a first time period from a cache of reference signatures stored at the meter;
   comparing, at the meter, a set of site signatures generated by the meter for the first time period with the first set of reference signatures;
   in response to determining that at least a first subset of the set of site signatures matches at least a first subset of the first set of reference signatures, reporting, via the meter, metering data but not reporting the first subset of the set of site signatures, the metering data indicating that first reference media represented by the first subset of the first set of reference signatures was presented during the first time period; and
   in response to determining that the set of site signatures fails to match the first set of reference signatures, reporting, via the meter, the set of site signatures.

2. A method as defined in claim 1 wherein the cache of reference signatures is representative of reference media predicted to be presented during a monitoring interval including the first time period.

3. A method as defined in claim 2 wherein the cache of reference signatures includes time information specifying time windows when respective subsets of reference signatures representative of respective reference media are to be used by the meter for signature matching, and the selecting of the first set of reference signatures from the cache of reference signatures is based on the time information.

4. A method as defined in claim 3 wherein a first time window specified for the first subset of the first set of reference signatures representative of the first reference media is different from a second time window specified for a second subset of the first set of reference signatures representative of second reference media.

5. A method as defined in claim 2 wherein the cache of reference signatures includes type information specifying whether the first reference media represented by the first subset of the first set of reference signatures corresponds to at least one of live media predicted to be presented during the first time period, or time-shifted media predicted to be presented during the first time period.

6. A method as defined in claim 5 wherein the metering data includes at least one of first information when the first reference media represented by the first subset of the first set of reference signatures corresponds to live media predicted to be presented during the first time period, or second information different from the first information when the first reference media represented by the first subset of the first set of reference signatures corresponds to time-shifted media predicted to be presented during the first time period.

7. A method as defined in claim 1 wherein the first set of reference signatures corresponds to a first type of signature from among at least two types of signatures supported by the meter, and the first type of signature has a lower resolution than a second type of signature from among the at least two types of signatures.

8. A method as defined in claim 1 further comprising receiving the first set of reference signatures from a processor located remotely from the monitored site.

9. A tangible computer readable storage medium comprising computer readable instructions which, when executed, cause a meter for monitoring media at a monitored site to at least:
select a first set of reference signatures representative of reference media predicted to be presented at the monitored site during a first time period from a cache of reference signatures stored at the meter;
compare a set of site signatures generated by the meter for the first time period with the first set of reference signatures;
in response to at least a first subset of the set of site signatures being determined to match at least a first subset of the first set of reference signatures, send metering data not including the first subset of the set of site signatures to a data collection site, the metering data indicating that first reference media represented by the first subset of the first set of reference signatures was presented during the first time period; and
in response to the set of site signatures being determined to fail to match the first set of reference signatures, send the set of site signatures to the data collection site.

10. The storage medium as defined in claim 9 wherein the cache of reference signatures is representative of reference media predicted to be presented during a monitoring interval including the first time period.

11. The storage medium as defined in claim 10 wherein the cache of reference signatures includes time information specifying time windows when respective subsets of reference signatures representative of respective reference media are to be used by the meter for signature matching, and the meter is to select the first set of reference signatures from the cache of reference signatures based on the time information.

12. The storage medium as defined in claim 11 wherein a first time window specified for the first subset of the first set of reference signatures representative of the first reference media is different from a second time window specified for a second subset of the first set of reference signatures representative of second reference media.

13. The storage medium as defined in claim 10 wherein the cache of reference signatures includes type information specifying whether the first reference media represented by the first subset of the first set of reference signatures corresponds to at least one of live media predicted to be presented during the first time period, or time-shifted media predicted to be presented during the first time period.

14. The storage medium as defined in claim 13 wherein the metering data includes at least one of first information when the first reference media represented by the first subset of the first set of reference signatures corresponds to live media predicted to be presented during the first time period, or second information different from the first information when the first reference media represented by the first subset of the first set of reference signatures corresponds to time-shifted media predicted to be presented during the first time period.

15. The storage medium as defined in claim 9 wherein the first set of reference signatures corresponds to a first type of signature from among at least two types of signatures supported by the meter, and the first type of signature has a lower resolution than a second type of signature from among the at least two types of signatures.

16. The storage medium as defined in claim 9 wherein the computer readable instructions, when executed, further cause the meter to receive the first set of reference signatures from a processor located remotely from the monitored site.

17. A meter to monitor media presented by a media device, the meter comprising:
a reference signature selector to select a first set of reference signatures representative of reference media predicted to be presented by the media device during a first time period from a cache of reference signatures stored at the meter;
a comparator to compare a set of site signatures generated by the meter for the first time period with the first set of reference signatures; and
a processor to:
in response to at least a first subset of the set of site signatures being determined to match at least a first subset of the first set of reference signatures, send metering data not including the first subset of the set of site signatures to a data collection site, the metering data indicating that first reference media represented by the first subset of the first set of reference signatures was presented during the first time period; and
in response to the set of site signatures being determined to fail to match the first set of reference signatures, send the set of site signatures to the data collection site.

18. A meter as defined in claim 17 wherein the cache of reference signatures is representative of reference media predicted to be presented during a monitoring interval including the first time period, the cache of reference signatures corresponding to a first type of signature from among at least two types of signatures supported by the meter, the first type of signature having a lower resolution than a second type of signature from among the at least two types of signatures.

19. A meter as defined in claim 18 wherein the cache of reference signatures includes time information specifying time windows when respective subsets of reference signatures representative of respective reference media are to be used by the meter for media monitoring, and the reference signature selector is to select the first set of reference signatures from the cache of reference signatures based on the time information.

20. A meter as defined in claim 19 wherein a first time window specified for the first subset of the first set of reference signatures representative of the first reference media is different from a second time window specified for a second subset of the first set of reference signatures representative of second reference media.

21. A meter as defined in claim 18 wherein the cache of reference signatures includes type information specifying whether the first reference media represented by the first subset of the first set of reference signatures corresponds to at least one of live media predicted to be presented during the first time period, or time-shifted media predicted to be presented during the first time period.

22. A meter as defined in claim 21 wherein the metering data includes at least one of first information when the first reference media represented by the first subset of the first set of reference signatures corresponds to live media predicted to be presented during the first time period, or second information different from the first information when the first reference media represented by the first subset of the first set of reference signatures corresponds to time-shifted media predicted to be presented during the first time period.

23. A meter as defined in claim 17 wherein the meter is to receive the first set of reference signatures from a second processor located remotely from the monitored site.

* * * * *